Feb. 23, 1971   L. G. DARBY ET AL   3,564,798
FASTENER FOR CELLULAR SANDWICH PANEL
Filed April 17, 1969

INVENTORS
LOUIS G. DARBY
JOHN J. GROSKO, JR
By George C Sullivan, agent
John J. Sullivan
Attorney United States Patent Office 3,564,798
Patented Feb. 23, 1971

3,564,798
FASTENER FOR CELLULAR SANDWICH PANEL
Louis G. Darby, Marietta, and John J. Grosko, Jr., Smyrna, Ga., assignors to Lockheed Aircraft Corporation, Burbank, Calif.
Filed Apr. 17, 1969, Ser. No. 817,003
Int. Cl. F16b 13/14
U.S. Cl. 52—303                    6 Claims

ABSTRACT OF THE DISCLOSURE

An improved potted fastener for honeycomb panels includes an anti-rotation projection, the shape and location of which is coordinated with a potting and vent hole in the fastener head to allow free flow of the potting compound over the entire length of the stem inside of the honeycomb. This improves the shear transfer, sonic fatigue, and sealing characteristics of the installed fastener. Moreover, this projection is located so that (1) an additional load path for the transfer of a tension load on the shank of the fastener is provided into the potting material, and (2) complete removal of the core and cured adhesive from the face sheets during installation is not necessary.

This fastener also includes a lip on its head for coaction with the adjacent panel face sheet. Relative movement is thereby prevented assuring the inserted fastener to face sheet load path as well as a good seal where required.

---

This invention relates broadly to connecting elements or fasteners, and more particularly to a fastener especially designed, constructed and adapted for insertion and installation in lightweight, fragile-core sandwich panes, notably those fabricated of cellular sandwich material like honeycomb, to form in effect an integral part of such panel and thereby provide connection means to supporting and/or supported structure.

The problem in securing or anchoring fasteners or attachment devices either inserts or studs in honeycomb type panels to facilitate installation of the panels to structure and/or structurally mounting attachments thereto arises largely due to the inherent fragile character of these panels with respect to concentrated loads. The practice that has heretofore developed is to reinforce the local area of the panel in which the fastener is intended to be located. To this end, potting material which is essentially a molded body of solidified resin has been employed. This has been best accomplished by drilling a hole in the panel approximately the size of the greatest transverse dimension of the part to be inserted which is then placed in position. The potting material in substantially liquid form and including a curing agent is injected preferably through a hole piercing the head at one end of the inserted fastener. When the potting material sets up or cures, the fastener is immovably imbedded therein.

The foregoing developed practice leaves much to be desired, however. Consider for example the case of a stud type fastener thus installed. When a tension load is applied to the stud by or through a supporting or supported member, there is a tendency for the potting material to slit or otherwise fail. Also there is a tendency of failure of the face sheet by separation from the honeycomb core or fatigue cracks around the potting material. When shear or shear and tension is applied to the stud, the tendency is for a separation of the head of the stud from the adjacent face sheet and a reduction in the load-carrying capability of the stud. Where the sealing requirement is important, this failure is likely to break the seal.

Even prior to this, during installation of the fastener insert or stud, special techniques are often required to be employed where the insert or stud is designed and constructed to include a lateral surface for abutment against the inner surface of one of the face sheets. In such case, it is necessary to remove the honeycomb core down to such face sheet. This often results in damage to the inner surface of the face sheet by the core removal tool.

The present invention proposes to overcome the above and other shortcomings of the prior art by means of and through the special design of a fastener adapted to be inserted and imbedded in fragile core sandwich panels that are particularly constructed so as to coact with the adjacent panel structure and potting material. The ultimate assembly is thereby assured to maintain as an integral structure with the panel undistorted or weakened from its original design configuration so that it is capable of maximum loading.

More specifically, the fastener herein contemplated is characterized by a head having a transverse dimension substantially equal to that of the drilled hole in the panel in which it is seated. The head of the fastener extends laterally at its outer end in an integral lip thereby enlarging the effective transverse dimension thereof to exceed that of the drilled hole so as to overlap by the dimension of its lip the adjacent surface of the face sheet against which it lies in flush abutment. This serves to prevent separation of the fastener from the face sheet and also to support the fastener in proper position until ultimately anchored by the potting material when cured.

Medially of its length, the fastener is formed or otherwise provided with at least one lateral projection which becomes imbedded in the cured potting material to act as an anti-rotation device in the ultimate assembly. Each such projection also serves to establish an additional load path into the potting material for a tension load when applied to the fastener. The tendency of the potting material to split is thereby reduced if not eliminated altogether.

With the above and other objects in view, as will be apparent, this invention consists in the construction, combination and arrangement of parts, all as hereinafter more fully described, claimed, and illustrated in the accompanying drawings wherein:

Figure 1:
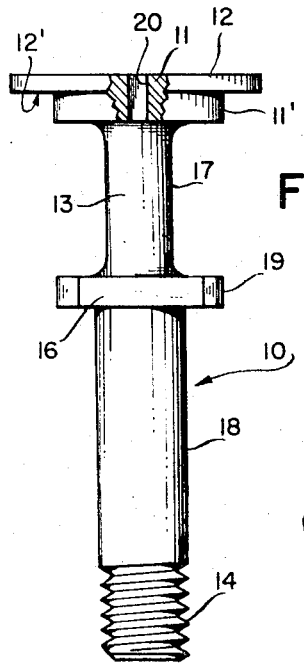
FIG. 1 is a side elevation of a fastener in the form of a stud as contemplated by the instant invention illustrating its preferred structural configuration and embodiment as presently contemplated.

Referring more specifically to the drawings, 10 designates a stud-type fastener designed and constructed following the teachings hereof. This stud 10 is formed at one end by a head 11 defined on its outer surface with an integrally formed lip 12, preferably of minimum thickness on the order of .020 inch and extending laterally beyond the periphery of the head 11 by a predetermined distance. Preferably this distance is at least .128 inch and serves to prevent moisture intrusion. In addition the lip 12 serves to insure against loss of shear and tension load carrying capability of the stud 10 due to the unseating thereof in the ultimate installation.

Extending from the head 11 in opposition to the lip 12 is a shank 13 which terminates in a threaded end 14 adapted to coact with a nut 15 in the conventional manner. Medially of the distance between the head 11 and the threads 14 at least one lateral projection 16 is formed on the shank 13. In the preferred form of the invention, such a projection extends from each side of the shank 13, being aligned and disposed in a common plane. This allows the portion of the shank 13 between the lateral projections 16 and the head 11 to be reduced to a predetermined dimension smaller as at 17 than the outer portion 18 of the shank 13 resulting in a saving of weight which is important in aircraft applications where the number of such fasteners 10 employed may be such as to make the aggregate weight involved substantial. Preferably these projections 16 have an aggregate or overall length substantially equal to the diameter of the head 11 whereby the peripheral edges 19 thereof are disposed in the plane of the peripheral edge 11' of the head 11. The head 11 is pierced by a pair of apertures 20 displaced angularly and preferably at right angles with reference to the lateral projections 16 for reasons to become more apparent.

Figure 3:
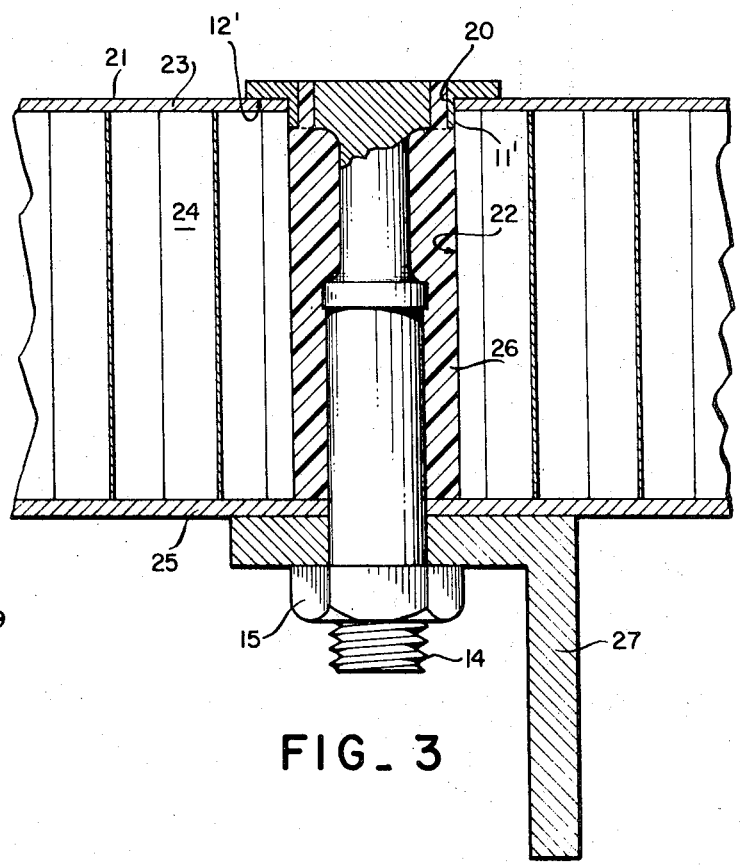
FIG. 3 is a section taken through a typical assembly or installation of the stud as shown in FIG. 1 in a honeycomb panel by which it is mounted on a supporting bracket or member.
Figure 2:
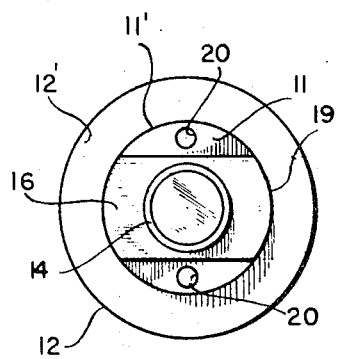
FIG. 2 is a bottom plan view of the stud shown in FIG. 1.

In view of the foregoing design and construction, particular reference is made to FIG. 3 which shows a typical installation of a stud 10 embedded or plotted in a honeycomb panel 21 as proposed herein. In order to accomplish this, the honeycomb panel 21 is first pierced, as for example by drilling or otherwise, with an aperture 22 to receive the stud 10. To this end the transverse dimension of this aperture 22 through one of the face sheets 23 and the honeycomb sandwich material 24 is made to correspond substantially to that of the head 11 so that the peripheral surface 11' of the read 11 is in flush contact with the adjacent edge of the face sheet 23. At this time the inner surface 12' of lip 12 abuts the adjacent outer surface of the face sheet 23.

The transverse dimension of the aperture 22 in the opposite face sheet 25 is substantially equal to that of the outer shank portion 18 of the stud 10. Thus, when the stud 10 is inserted through the panel 21, the coaction of the head 11 and lip 12 with one face sheet 23 and the outer shank portion 18 of the stud 10 with the other face sheet 25 serves to locate and maintain the stud 10 in position while a suitable potting material 26 is being loaded into the space defined by the aperture 22 as well as during the curing or setting period.

Loading of the potting material 26 as stated in liquid form with a curing agent is accomplished by injecting it in one of the holes 20, the other hole 20 being used as a vent and to monitor such loading to assure that the entire space is filled. The orientation of the holes 20, i.e., their right angular displacement relative to the projections 16, assures complete filling of the space around the shank 13 and on both sides of the lateral projections 16.

By making the peripheral edges 19 of the lateral projections 16 terminate in the plane of the head 11, maximum area in the projections 16 is obtained. This decreases the load on the underside surface of the head 11 and allows the shank diameter 17 between the projections 16 and the head 11 to be reduced. At the same time, by making the diameter of the outer portion 18 of the shank 13 constant, variations in the thickness of the honeycomb sandwich 24 may be tolerated.

With the panel 21 thus provided with one or multiple fasteners such as studs 10, it is capable of mounting an appropriate bracket or brackets 27 in its intended installation. In the case of a stud fastener as illustrated, the extending shank portion 18 passes through an appropriate hole in the bracket 27 where the threads 14 coact with the bolt 15. When on the other hand an insert type fastener is involved, a conventional bolt, not shown, would be used to pass through the hole in the bracket 27 for coaction with the internal threads of the insert.

While shown and described in what is believed to be the most practical and preferred form or embodiment, it is apparent that departures from this specific structure will suggest themselves to those skilled in the art. Such innovations and variations may be made without departing from the spirit and scope of the invention as covered by the appended claims.

What is claimed is:

1. A fastener for a cellular sandwich panel having opposed face sheets and pierced by an aperture comprising:

a generally circular head defined by a peripheral edge surface adapted to abut the edge of said aperture in one of said face sheets when located therein;

a lip extending laterally from the outer end of said head adapted to overlie with its inner surface in flush abutment against the outer surface of said one face sheet when said head is located in said one face sheet aperture;

a shank extending from the side of said head opposite to said lip and terminating in an end adapted to coact with a complemental connecting element operative in opposition to the surface of the other of said face sheets when the head is located in the aperture, said shank being defined by a surface adapted at the same time to abut the edge of said aperture in said other face sheet;

a lateral projection on said shank medially thereof defined by substantially parallel sides establishing a transverse dimension less than the diameter of said head and an unbroken outer edge surface disposed in the plane of the peripheral edge surface of said head; and a pair of holes piercing said head each eccentrically located therein radially outwardly of said shank and in angular relation to said projection.

2. The fastener of claim 1 wherein said lip has a thickness of about .020 inch and extends at least .128 inch beyond said peripheral edge surface of said head.

3. The fastener of claim 1 wherein said projection is located substantially midway between said panel face sheets when said head is located in said one face sheet aperture and said shank on each side of said projection has a uniform transverse dimension and the portion of said shank between said head and said projection has a transverse dimension less than that of the shank portion on the other side of said projection.

4. The fastener of claim 1 wherein said lateral projection extends symmetrically from opposite sides of said shank.

5. The fastener of claim 1 in combination with said panel, said fastener being disposed therein with said head peripheral edge surface in snug engagement with said one face sheet aperture and said fastener shank adjacent said other face sheet in snug engagement therewith about said aperture therein, and including a cured resin filling the area within said panel between said face sheets and in intimate surface contact with said shank and projection when said head is located in said first face sheet aperture as aforesaid whereby said fastener and said panel form in effect an integral assembly.

6. The fastener of claim 5 wherein said shank end terminates in external threads extending beyond said outer face sheet surface, and said connecting element is a nut threadable on said threaded shank end.

References Cited

UNITED STATES PATENTS

| | | | |
|---|---|---|---|
| 868,067 | 10/1907 | Berry | 85—1X |
| 2,654,685 | 10/1953 | Voelker | 52—506X |
| 2,798,404 | 7/1957 | Schaefer et al. | 85—9 |
| 3,008,552 | 11/1961 | Cushman et al. | 52—617 |
| 3,282,015 | 11/1966 | Rohe et al. | 52—617X |
| 3,305,996 | 2/1967 | Shapiro | 52—617 |

ALFRED C. PERHAM, Primary Examiner

U.S. Cl. X.R.

52—506, 617; 151—41.7